United States Patent [19]

Derivaz

[11] Patent Number: 4,610,285
[45] Date of Patent: Sep. 9, 1986

[54] CUTTING TOOL WITH REMOVABLE BLADES

[75] Inventor: Charles Derivaz, La Tour-De-Peilz, Switzerland

[73] Assignee: Samvaz S.A., Fenil-Sur-Vevey, Switzerland

[21] Appl. No.: 775,700

[22] Filed: Sep. 13, 1985

Related U.S. Application Data

[63] Continuation of Ser. No. 574,141, Jan. 26, 1984, abandoned.

[30] Foreign Application Priority Data

Feb. 9, 1983 [CH] Switzerland .............................. 720/83

[51] Int. Cl.⁴ .............................................. B27G 13/00
[52] U.S. Cl. ................................... 144/231; 144/23 D; 407/32; 407/41; 407/49
[58] Field of Search .................. 30/307; 144/230, 231, 144/374; 407/31, 32, 41, 49, 52

[56] References Cited

U.S. PATENT DOCUMENTS

| 2,119,298 | 5/1938 | Simowski | 407/31 |
| 3,868,751 | 3/1975 | Holthuis | 144/230 X |
| 3,986,543 | 10/1976 | Slayton et al. | 144/236 |
| 4,009,742 | 3/1977 | Ziegelmeyer | 144/218 X |

FOREIGN PATENT DOCUMENTS

| 915265 | 7/1954 | Fed. Rep. of Germany . |
| 960668 | 3/1957 | Fed. Rep. of Germany . |
| 1195934 | 10/1957 | Fed. Rep. of Germany . |
| 766802 | 7/1934 | France . |
| 2058652 | 5/1971 | France . |
| 2477460 | 9/1981 | France . |
| 638131 | 9/1983 | Switzerland .......................... 407/31 |

*Primary Examiner*—Douglas D. Watts
*Attorney, Agent, or Firm*—Young & Thompson

[57] ABSTRACT

The present invention relates to a cutting tool with removable blades and which comprises a stack of discs (2) each having a cut (6) opened on its periphery, and a clamping device compressing the discs, the angular position of the discs relative to each other being such that, in service position, the cuts form peripheral longitudinal housings. Reversible blades (10), the cutting edge (11) of which is situated on a diameter longer than the external diameter of the discs, are fixed in a removable manner in the housings, each by a locking wedge (14) located in the housing parallel to the blade and locking the latter by jamming when the tool is driven in rotation.

8 Claims, 3 Drawing Figures

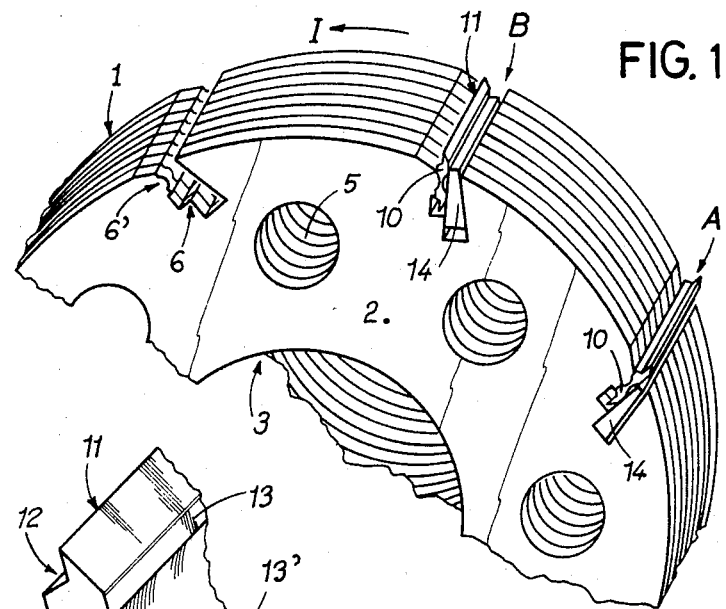
FIG. 1
FIG. 2
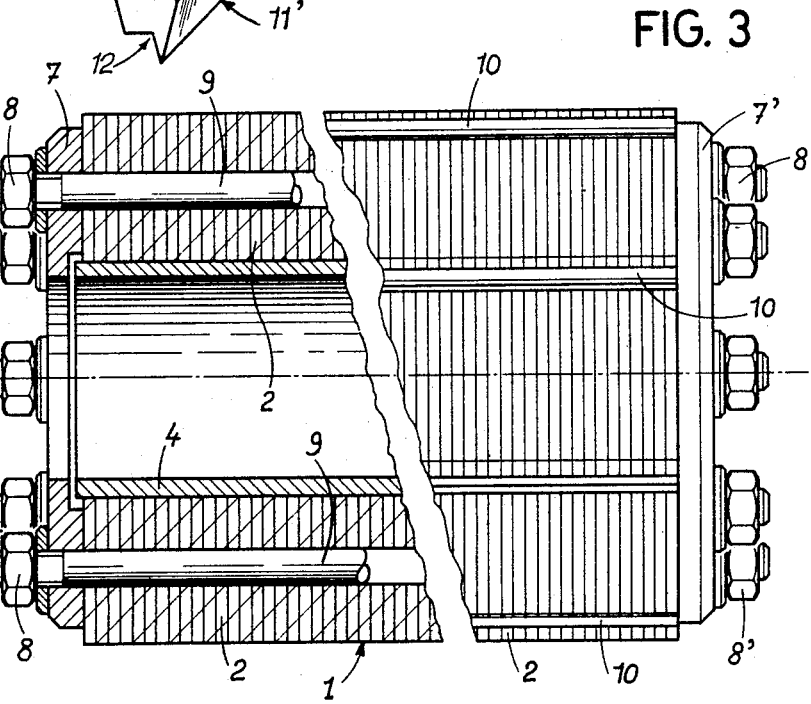
FIG. 3

CUTTING TOOL WITH REMOVABLE BLADES

This application is a continuation of application Ser. No. 574,141, filed Jan. 26, 1984, now abandoned.

The present invention relates to a cutting tool with removable blades or knives, usable for example as a plane for wood.

The known cutting tools of the above type comprise a massive tool-holder body presenting housings intended to receive blades fixed by means of locking devices also disposed in each housing and necessitating the individual checking of the clamping force of each fixing means and of the position of each blade, this constituting a difficult and long operation to carry out.

The purpose of this invention therefrore consists in supplying a cutting tool with removable blades, obviating to the above drawbacks of the known tools, and in which the blades are all simultaneously and automatically positioned and locked in service position.

The cutting tool with removable blades, which is the object of the present invention, to achieve this purposes is characterized by the fact that it comprises a stack of discs each having at least a cut opened on its periphery, and a clamping device compressing the stack of discs, by the fact that the angular position of the discs relative to each other is such that, in working position, the cuts form at least one peripheral longitudinal housing, and by the fact that at least a blade, the cutting edge of which is situated on a diameter longer than the external diameter of the discs, is fixed in at least one of the housings by means of a locking element disposed in said housing parallel to said blade and locking said blade by jamming when the tool is rotated.

The present invention will now described in detail by reference to the annexed drawing illustrating schematically and by way of example one embodiment of the cutting tool.

FIG. 1 is a partial view in perspective showing the locking element respectively in out-of-service position (A) and in service position (B).

FIG. 2 is a partial view in perspective of a blade.

FIG. 3 is a general lateral and partly cross-sectional view of the tool.

The cutting tool as shown in FIGS. 1 to 3 comprises a stack 1 of discs 2, preferably of metallic discs, for example of aluminum, iron, brass, or of another appropriate alloy. Each disc 2 presents a central opening 3 allowing introducing it on a tube 4 intended to be introduced and fixed on the rotative shaft (not shown) of a machine or a motor, as well as openings 5 intended on one hand to lighten the disc and on the other hand to allow putting the tool in working position, as will be described later. Finally, each disc 2 presents cuts 6 which are distributed on the periphery of the disc and opened thereon.

The stack 1 of discs 2 is thus mounted on the tube 4, between the end plates 7,7', and compressed by clamping by means of nuts 8,8' screwed on the threaded ends of clamping rods 9 passing through the openings 5.

Finally, the cutting tool comprises removable blades or knives 10, generally made of high-speed steel, and presenting two free edges which are sharpened in such a manner as to form each a cutting edge 11,11'. Each blade 10 is thus reversible and presents further two longitudinal chip-breakers 12 on its front face and two flats 13,13' on its back face (FIG. 2).

Each blade 10 is introduced with clearance in a longitudinal housing formed by the alignment of the cuts 6, against the front side 6' thereof, and is maintained in this housing by a locking element constituted here by an elongated wedge 14. Of course, the shape of the front side 6' of the housing 6 corresponds to the shape of the front face 10' of the blade 10. The elongated wedge 14 is also introudced with clearance in the same housing 6, parallel to the blade 10, and in such a manner that its front face is in contact with both flats 13,13' of the back face of said blade 10. Preferably, the blades 10 and the locking wedges 14 are made of rolled steel shapes.

As shown in FIG. 1, the longitudinal wedge 14 is located in the bottom of the housing 6 when the tool is in out-of-service position (A). However, as soon as the tool is driven in rotation according to the arrow I, centrifugal force acts on the wedge 14 so as to push it radially outwards of the housing 6, thus causing the front side of the wedge 14 to exert pressure on the flats 13,13' of the blade 10, in order to lock it in working position (B) by jamming against the front face 6' of the housing 6.

The positioning and locking of all the blades 10 of the tool are thus obtained automatically by jamming by means of the longitudinal wedges 14 as soon as the tool is rotated, the clamping in service position of the blades being the better the higher is the rotation speed.

The cutting tool with removable blades according to the invention has the following advantages with regard to the known devices:

it does not necessitate the precise setting of each blade, separately, all the blades being simultaneously positioned and locked by the centrifugal force acting on the longitudinal wedges;

it is easy and economical to use, due to the fact that each blade comprising two sharpened edges can be used twice by turning it before being replaced by another one;

the length of the stack of discs is not limited, since several blades can be introduced the ones after the others in the same longitudinal housing;

its manufacture is easy and not expensive, since the discs having all the same shape can be produced by automated cutting in thin plates of aluminum, brass or other appropriate alloys, and the blades are of simple conception; furthermore, the blades and locking wedges can be rolled shapes; and its use is less noisy than the known tools in which the gaps necessary to receive the individual and separate positioning and clamping devices are suppressed.

The cutting tool according to the invention is more particularly useful as a plane for wood.

What we claim is:

1. Cutting tool with removable blades, comprising a stack of discs each having at least a cut opened on its periphery, and clamping means compressing the stack of discs, the angular position of the discs relative to each other being such that, in working position, the cuts form at least one peripheral longitudinal housing, and at least a blade, the cutting edge of which is situated on a diameter longer than the external diameter of the discs, fixed in at least one of the housings by means of a locking element disposed in said housing parallel to said blade, the size of the cut being such that the blade and the locking element can be introduced with clearance in the longitudinal housing formed by the cut, the locking element being an elongated wedge which bears against the blade when the tool is rotated, the wedge having each means including wedge surfaces that converge in a radially outward direction whereby centrifugal force causes the wedge to lock said blade by jamming when the tool is rotated.

2. Tool according to claim 1, said clamping means comprising a plate at each end of the stack of discs, these plates being connected in working position to the rotating means of the tool and secured to each other.

3. Tool according to claim 2, in which each disc has a central opening and is mounted on a tube adapted to cooperate with the rotating means of the tool and passing through said opening, said clamping means further comprising clamping rods disposed longitudinally inside the piling through corresponding openings provided in said end plates and in the discs.

4. Tool according to claim 1, in which the front side of the peripheral cuts has a shape corresponding to that of the profile of the front face of the blades.

5. Tool according to claim 1, in which each blade comprises at least a sharpened longitudinal edge and at least a longitudinal chip-breaker.

6. Tool according to claim 5, in which each blade is reversible and comprises two sharpened longitudinal edges, and further has at least a longitudinal positioning flat on its back side and two longitudinal chip-breakers on its front side.

7. Tool according to claim 1, said wedge having a front side that bears against the back side of the blade with reference to the direction of rotation of the tool.

8. Tool according to claim 1, the housing having a non-planar surface thereof in contact with a non-planar surface of corresponding shape on the blade.

* * * * *